US008827665B2

(12) United States Patent
Dybdal (10) Patent No.: US 8,827,665 B2
(45) Date of Patent: Sep. 9, 2014

(54) IMMERSION MOTOR (75) Inventor: Soren Dybdal, Birkerod (DK)

(73) Assignee: Grundfos Management A/S, Bjerringbro (DK)

( * ) Notice: Subject to any disclaimer, the term of this patent is extended or adjusted under 35 U.S.C. 154(b) by 219 days.

(21) Appl. No.: 13/126,520

(22) PCT Filed: Aug. 13, 2009

(86) PCT No.: PCT/EP2009/005868
§ 371 (c)(1),
(2), (4) Date: Apr. 28, 2011

(87) PCT Pub. No.: WO2010/051870
PCT Pub. Date: May 14, 2010

(65) Prior Publication Data
US 2011/0211978 A1 Sep. 1, 2011

(30) Foreign Application Priority Data

Nov. 5, 2008 (EP) ..................... 08019315

(51) Int. Cl.
*F04B 17/03* (2006.01)
*H02K 5/132* (2006.01)
*H02G 3/22* (2006.01)

(52) U.S. Cl.
CPC . *H02G 3/22* (2013.01); *H02K 5/132* (2013.01)
USPC ........................ 417/423.3; 417/410.1; 310/71

(58) Field of Classification Search
CPC ...... F04D 13/08; H01R 13/523; H02K 5/132; H02K 5/225
USPC ................. 417/423.3, 410.1; 310/71
See application file for complete search history.

(56) References Cited

U.S. PATENT DOCUMENTS 4,193,604 A * 3/1980 Sarvanne ..................... 174/658
4,593,940 A 6/1986 Wilder
(Continued)

FOREIGN PATENT DOCUMENTS

| DE | 3833370 A1 | 4/1990 |
| DE | 4213306 C1 | 9/1993 |
| FR | 2567239 A1 | 1/1986 |

OTHER PUBLICATIONS

Int'l Search Report Issued Jan. 21, 2010 in Int'l Application No. PCT/EP2009/005868; Written Opinion.

*Primary Examiner* — Peter J Bertheaud
*Assistant Examiner* — Dominick L Plakkoottam
(74) *Attorney, Agent, or Firm* — Panitch Schwarze Belisario & Nadel LLP (57) ABSTRACT

An immersion motor includes a housing (3) having a wall (4) with a watertight cable penetration (5, 6; 5, 6'). The cable penetration includes an inlet (5) in the wall (4) for a cable (25) and a sealing collar (6; 6') that can be released from the inlet (5) having a penetration (20) for the cable (25). The sealing collar (6; 6') includes a first seal (45; 45') disposed on the penetration (20) and means for applying force (75, 85, 90) to the first seal (45; 45'), which is designed for permanently applying force to the first seal (45; 45') radially in the penetration (20). The cable penetration (5, 6; 5, 6') further includes means for releasably attaching (35, 40) the sealing collar (6; 6') to the inlet (5). At least one second seal (120, 125) is provided between the sealing collar (6; 6') and the inlet (5).

12 Claims, 6 Drawing Sheets

(56) References Cited

U.S. PATENT DOCUMENTS

| | | | |
|---|---|---|---|
| 4,626,721 A * | 12/1986 | Ouchi | 310/71 |
| 5,801,465 A * | 9/1998 | Yamada | 310/71 |
| 5,920,035 A * | 7/1999 | Haney et al. | 174/652 |
| 7,071,588 B1 * | 7/2006 | Khazanov | 310/71 |
| 2008/0132115 A1 * | 6/2008 | Jackson et al. | 439/587 |

* cited by examiner

IMMERSION MOTOR

CROSS-REFERENCE TO RELATED APPLICATIONS

This application is a Section 371 of International Application No. PCT/EP2009/005868, filed Aug. 13, 2009, which was published in the German language on May 14, 2010, under International Publication No. WO 2010/051870 A1 and the disclosure of which is incorporated herein by reference.

BACKGROUND OF THE INVENTION

The present invention relates generally to an immersion motor as well as a submersible pump with such an immersion motor.

Immersion or submersible motors are usually completely immersed in liquid, for example water, during their operation. Such a submersible motor is a typical constituent of a submersible pump or submersible pump unit, and lies together with the submersible pump within a shared submersible pump housing. Submersible motors are here routinely supplied with electrical energy via electric feed lines. For purposes of electrical supply, it is necessary that the cables are introduced into the submersible motor housing or submersible pump housing in a watertight manner.

For example, a watertight cable feed-through for supplying power to a submersible motor is known from DE 42 13 306 C1. However, impurities, e.g., particles or dirt, can easily get into the seal in submersible motors with such cable feed-throughs, in particular when dismantling the cable from the submersible motor housing. Over time, this can result in a limited sealing affect or even complete loss of sealing action by the cable feed-throughs, so that the proper function of the submersible motor is no longer guaranteed.

BRIEF SUMMARY OF THE INVENTION

Therefore, an objective of a preferred embodiment of the present invention is to create an immersion or submersible motor improved in this regard, and a submersible pump with such a submersible motor.

The above objective is achieved by a submersible motor or a submersible pump with a submersible motor having a housing, which includes a wall with a watertight cable feed-through, which includes an inlet in the wall for a cable and a sealing collar that has a feed-through for the cable and can be detached from the inlet. Advantageous preferred embodiments of the present invention are indicated in the following specification and the drawing.

The submersible motor according to a preferred embodiment of the present invention includes a housing, which has a wall with a watertight cable feed-through. The cable feed-through includes an inlet in the wall for a cable and a sealing collar that can be detached from the inlet with a feed-through for the cable. The sealing collar has a first seal located on the feed-through, and a means for applying force to the first seal. The latter is here designed for permanently applying force to the first seal radially in the feed-through. In addition, the cable feed-through has means for detachably securing the sealing collar to the inlet, wherein at least a second seal is provided between the sealing collar and inlet.

In the submersible motor according to a preferred embodiment of the present invention, the cable can be introduced into the housing of the submersible motor by guiding the cable through the feed-through of the sealing collar on the one hand. The permanent radial application of force to the seal into the feed-through permanently holds the seal tightly against the cable. This establishes a permanent seal between the cable and sealing collar. The sealing collar is further tightly and detachably connected with the wall of the housing, in that the second seal enables a sealing abutment between the sealing collar and inlet. The housing-side opening for the sealing collar feed-through and the outside opening of the inlet in the wall here overlap, so that the cable gets inside the submersible motor. As a result, the cable feed-through is made watertight by having the cable with the first seal situated watertight in the sealing collar, and by having the sealing collar with the second seal situated watertight at the inlet of the housing wall. The cable can here be detached from the submersible motor housing wall by detaching the sealing collar from the wall inlet. Conversely, the cable can be mounted to the wall by mounting the sealing collar in the inlet in the wall.

On the one hand, within the meaning of a preferred embodiment of the present invention, the application of a permanent force to the first seal radially in the feed-through is to be understood as the type of force application that brings about a sealing abutment between the first seal and cable, even after a long period of time and possibly accompanied by a decreased elasticity of the first seal, for example via plastic deformation or embrittlement. This takes place by way of a permanent outer application of force to the first seal, as described below. As a result, the cable feed-through remains permanently watertight, so that a submersible motor according to the invention has to be serviced less often.

On the other hand, the application of a permanent force to the first seal radially in the feed-through can also be understood as the type of force application that persists even when the cable is detached from the housing wall. The first seal is here preferably provided for the permanent, tight abutment on the cable and on an inner periphery of the feed-through, independently of the attachment of the sealing collar to the housing. This makes it possible to detach the sealing collar from the inlet in the housing wall, while the cable remains situated watertight in the feed-through of the sealing collar. This prevents particles or dirt from getting between the first seal and the cable given a dismantled sealing collar, and contaminating or damaging the first seal in the process. As a result, a continued reliable seal is ensured even when the cable is again assembled.

The first seal is preferably fabricated out of a soft and elastic material. Such a material can be suitably adjusted to a section of the outer peripheral surface of the cable. In this way, irregularities on the cable casing or deviations from the exact stipulated tolerances do not affect the sealing effect of the first seal. The soft and elastic material preferably involves rubber or an elastomer. In addition, the seal is preferably a sealing ring, which circumferentially surrounds the longitudinal axis of the feed-through for the cable.

In a preferred embodiment of the present invention, the first seal in the submersible motor is circumferentially surrounded by a sealing collar housing. It is especially preferred that the sealing collar housing is designed as a casing for the first seal along an axial section of the sealing collar, for example in the form of a sleeve. It is further preferred that the sealing collar housing forms at least part of the feed-through. The first seal is preferably annular, and its inner periphery tightly abuts the cable, while its outer periphery tightly abuts the interior wall of the sealing collar housing. This makes it possible to pre-stress the seal in a radial direction.

The means for applying force to the first seal in the submersible motor preferably comprises two clamping surfaces, between which the first seal lies, and by means of which the first seal has a force applied axially to it in such a way as to press the seal radially into the feed-through and against the cable. It is especially preferred that the first seal here consists of a soft and elastic material as described above, which abuts an inner periphery of the feed-through or sealing collar housing. The axial application of force to the first seal via clamping surfaces now causes the material of the first seal to be axially clinched and to radially yield. Since the first seal abuts the inner periphery of the feed-through, the material of the first seal penetrates radially inward, into the feed-through, and is pressed against a cable situated there.

In a further development of a preferred embodiment of the present invention, a permanent force is applied to the first seal into the feed-through with a means for applying force to the first seal that comprises at least one compression spring element acting in the axial direction. This compression spring element applies force to at least one of the clamping surfaces. The compression spring element is here preferably axially clinched relative to its rest position, and hence pre-stressed. In this way, the compression spring element abuts the first seal under a stress, even given an altered axial length of the latter. Therefore, even if the first seal loses elasticity over time, and for example is exposed to plastic deformation, a sufficiently high force continues to be applied by way of the compression spring element. As a result, an abutment force to the sealing surface can be ensured between the cable and seal independently of the internal stress of the seal.

The compression spring element is usefully a disk spring or disk spring packet. Disk springs advantageously have high spring constants, and therefore generate a high level of force acting on the first seal, and consequently a high sealing action. In a preferred embodiment of the present invention, the compression spring element is oriented in such a way as to act in the direction of the longitudinal axis of the feed-through. The compression spring element includes a central opening that is coaxially oriented with the feed-through, so that it circumferentially surrounds the feed-through of the sealing collar. It is further preferred that the compression spring element pushes off a front wall detachably arranged on the sealing collar. Detaching this front wall from the sealing collar housing here enables a complete relaxation of the compression spring element. For example, the application of force to the first seal can be suspended as a result. A cable can be introduced into the feed-through of the sealing collar, or replaced as needed, for example.

In an advantageous further development of a preferred embodiment of the present invention, the means for attaching the sealing collar in the submersible motor include an abutment surface on the wall that is angled relative to the longitudinal axis of the feed-through of the sealing collar, and situated on the sealing collar. This abutment surface allows the sealing collar to easily abut the wall of the submersible motor housing. It is especially preferred that the abutment surface extends perpendicular to the longitudinal axis of the feed-through. For purposes of attachment to the wall, it is usefully that the abutment surface comprise screw holes for bolting the abutment surface with the wall.

In an advantageous preferred embodiment of the present invention, the submersible motor is provided with a third seal to establish a tight abutment on the outer periphery of the cable and an inner periphery of the sealing collar housing. The third seal here preferably also abuts an inner periphery of the feed-through of the sealing collar housing. This ensures a larger abutment surface on the cable, and hence an enhanced retention force between the cable and seals in an axial direction. As a result, the third seal acts in particular as strain relief for the cable. In this way, forces acting on the cable caused by tensile stress outside the housing of the submersible motor are conveyed from the seals to the sealing collar housing. By contrast, the cable end lying within the submersible motor housing, and in particular electrical contacts lying at the cable end, are not exposed to tensile stress. In particular, the third seal can be situated on the outside of the housing of the first seal, so that the third seal simultaneously acts as a strain relief for a section of the cable lying on the first seal, and its sealing action is not diminished by exposure to tensile forces.

In another preferred further development of the present invention, the sealing collar in the submersible motor has a clamping element for clamping the cable. This clamping element is here designed in particular as a strain relief for the cable, and detachably connected with the sealing collar housing. The clamping element transfers the tensile forces acting on the cable to the housing.

The clamping element preferably lies on the outside of the casing of the first seal. In this way, the cable is also relieved of tensile forces in the area of the first seal.

In this way, an irregular application of force on the cable along the periphery caused by tensile stress is also avoided in the area of the first seal via one of the aforementioned options for cable strain relief. As a result, a uniform application of force on the cable along the periphery ensures a permanently high sealing action by the first seal.

The clamping element in the submersible motor preferably comprises a surface that circumferentially surrounds the feed-through for the cable and has circumferentially arranged ribs. In particular such circumferentially oriented ribs prevent strain on the cable along the longitudinal axis of the feed-through. It is especially preferred that the clamping element here is designed as a clamping ring formed of two circumferentially arranged ring sections that can be exposed to a force relative to each other. In this way, the cable is detachably engaged by the clamping element, so that the cable can be easily detached from the sealing collar. In particular, these ring sections comprise mutually opposing surfaces extending radially outward from the inner periphery, which can be bolted together and/or with the sealing collar housing.

In an advantageous further development of the present invention, the second seal in the submersible motor has at least one sealing ring, which is arranged on the outer periphery of the sealing collar, and abuts the inner periphery of the inlet. In another preferred embodiment of the present invention, the sealing ring can also be arranged on the inner periphery of the inlet, and designed to abut the outer periphery of the sealing collar. As an alternative, the second seal can also lie axially between the housing of the submersible motor and a portion of the sealing collar, and be arranged either on the submersible motor housing or the sealing collar.

It is further preferred that the submersible motor comprises an electromagnetic shield for the cable on an axial section of the feed-through that leads into the housing viewed from the first seal. The electromagnetic cable shield preferably comprises a rim of metal tongues, which extend radially inwardly from the sealing collar housing, and abut the outer periphery of the cable, curved inwardly relative to the housing at an acute angle.

The submersible pump according to a preferred embodiment of the present invention includes a submersible motor according to the present invention. The submersible motor preferably lies along with other constituents of the submersible pump in a shared submersible pump housing, i.e., the submersible motor housing is formed by the submersible pump housing.

BRIEF DESCRIPTION OF THE SEVERAL VIEWS OF THE DRAWINGS

The foregoing summary, as well as the following detailed description of preferred embodiments of the present invention, will be better understood when read in conjunction with the appended drawings. For the purpose of illustrating the present invention, there are shown in the drawings embodiments which are presently preferred. It should be understood, however, that the invention is not limited to the precise arrangements and instrumentalities shown. In the drawings:

FIG. 2 is a cross-sectional longitudinal view of the housing of the submersible pump according to FIG. 1 with the watertight cable feed-through;

DETAILED DESCRIPTION OF THE INVENTION

Certain terminology is used in the following description for convenience only and is not limiting. The word "front" designates a direction in the drawings to which reference is made. The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Figure 1:
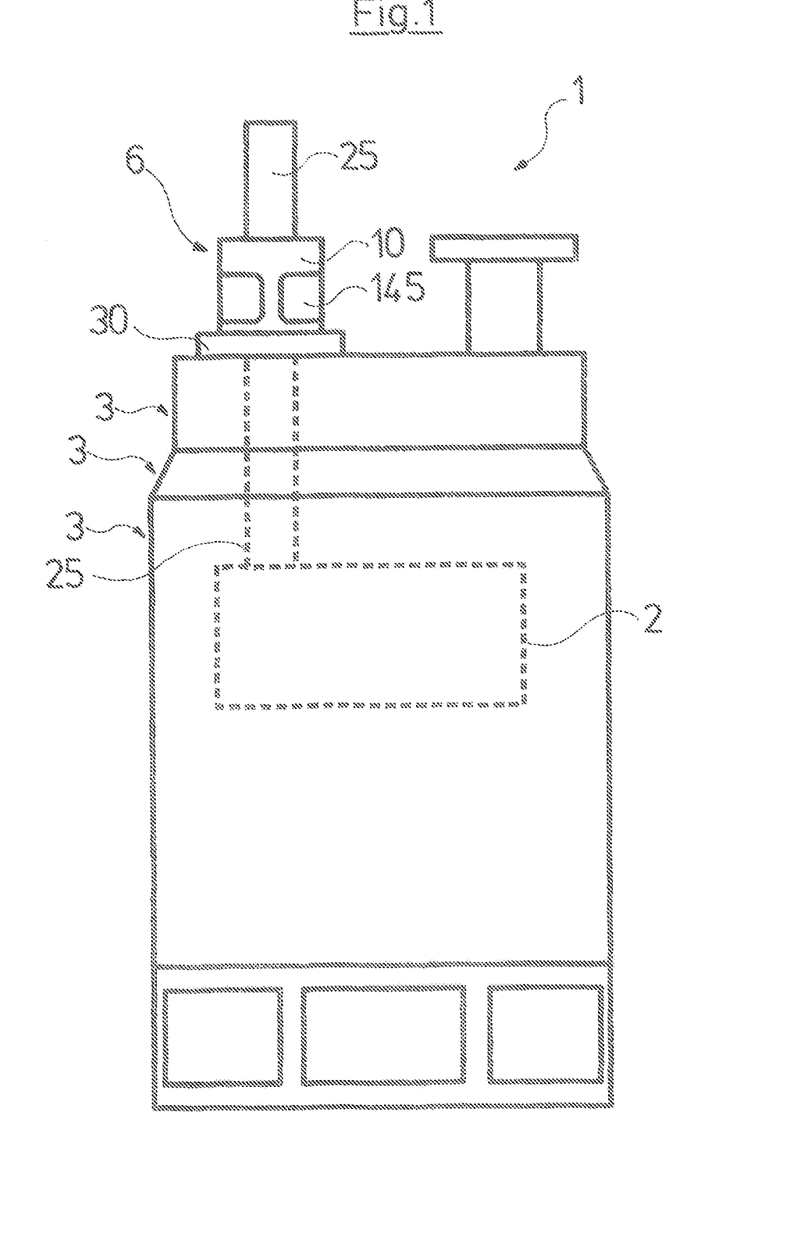
FIG. 1 is a simplified elevational view of a submersible pump with a submersible motor in a shared housing with a watertight cable feed-through according to a preferred embodiment of the present invention.

Referring to the drawings in detail, wherein like numerals indicate like elements throughout the several views, a submersible pump 1 shown on FIG. 1 preferably includes a submersible motor 2, and is arranged with the latter in a shared housing 3. Therefore, the housing 3 simultaneously consists of the housing 3 of the submersible pump and housing 3 of the submersible motor 2. As illustrated on FIG. 2, a wall 4 of the housing 3 is provided with a watertight cable feed-through, which comprises an inlet 5 in the wall 4 and a sealing collar 6.

The sealing collar 6 shown in FIG. 2-8 preferably includes an essentially rotationally symmetrical sealing collar housing 10. A feed-through 20 extends along the longitudinal axis 15 of the sealing collar housing 10, and includes a circular cross section at each axial section. A cable 25 can be guided through the feed-through 20, using the sealing collar 6 to pass through the wall 4 of the submersible pump housing 3 and inside the submersible pump 1.

Figure 3:
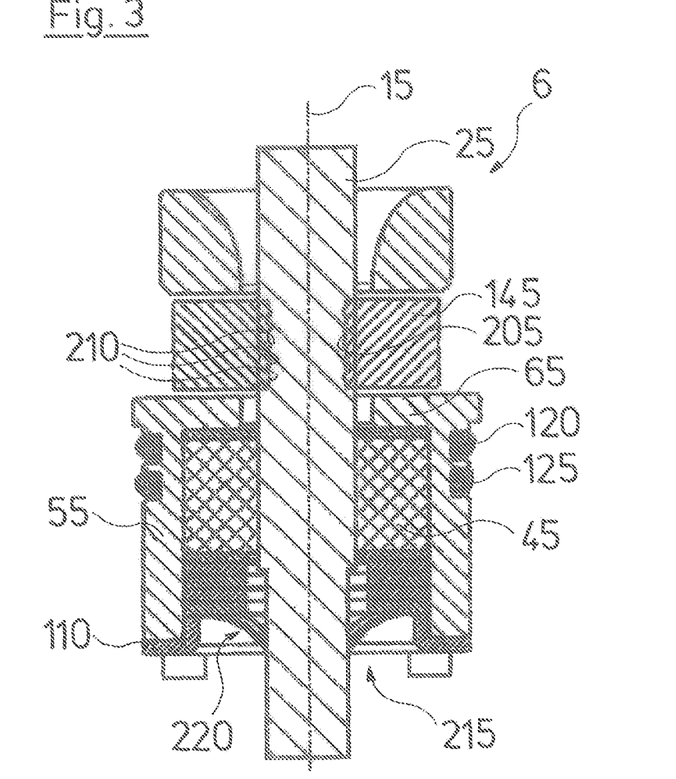
FIG. 3 is a cross-sectional longitudinal view of the sealing collar of the cable feed-through according to FIG. 2 in accordance with a first preferred embodiment of the present invention.
Figure 4:
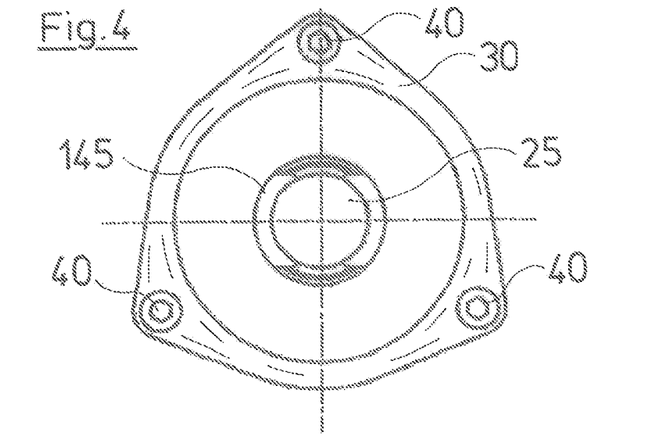
FIG. 4 is an axial top view of the sealing collar according to FIG. 3, viewed entering the housing.
Figure 5:
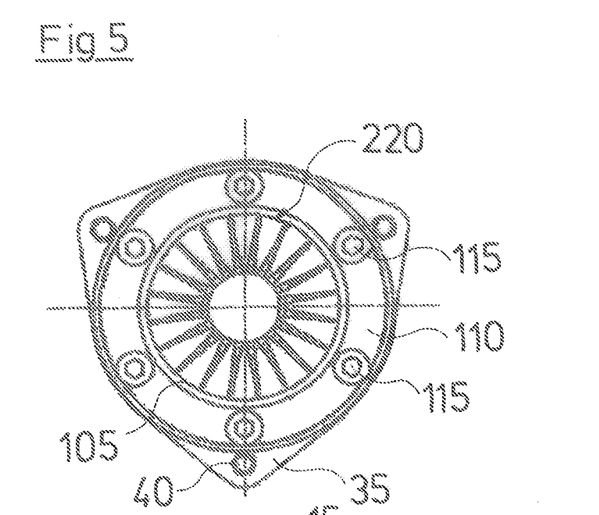
FIG. 5 is an axial top view of the sealing collar according to FIG. 3, viewed exiting the housing.
Figure 6:
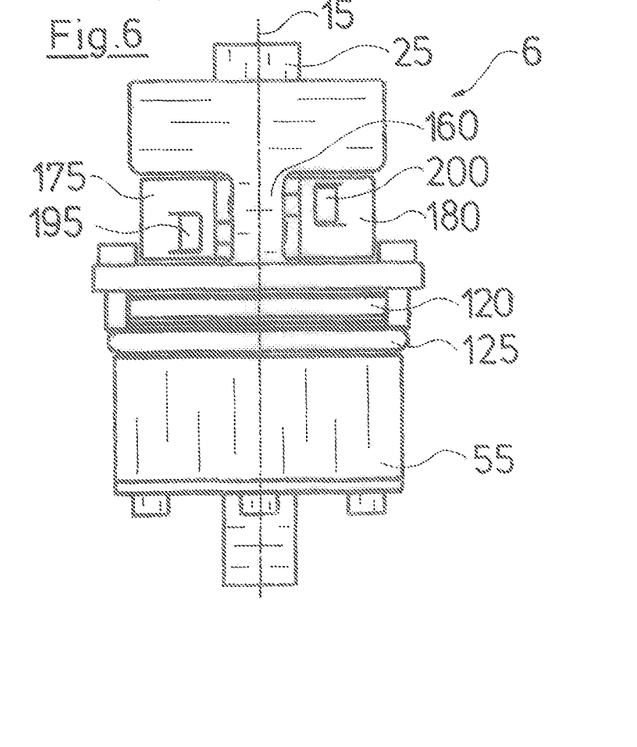
FIG. 6 is a radial top view of the sealing collar according to FIG. 3.
Figure 7:
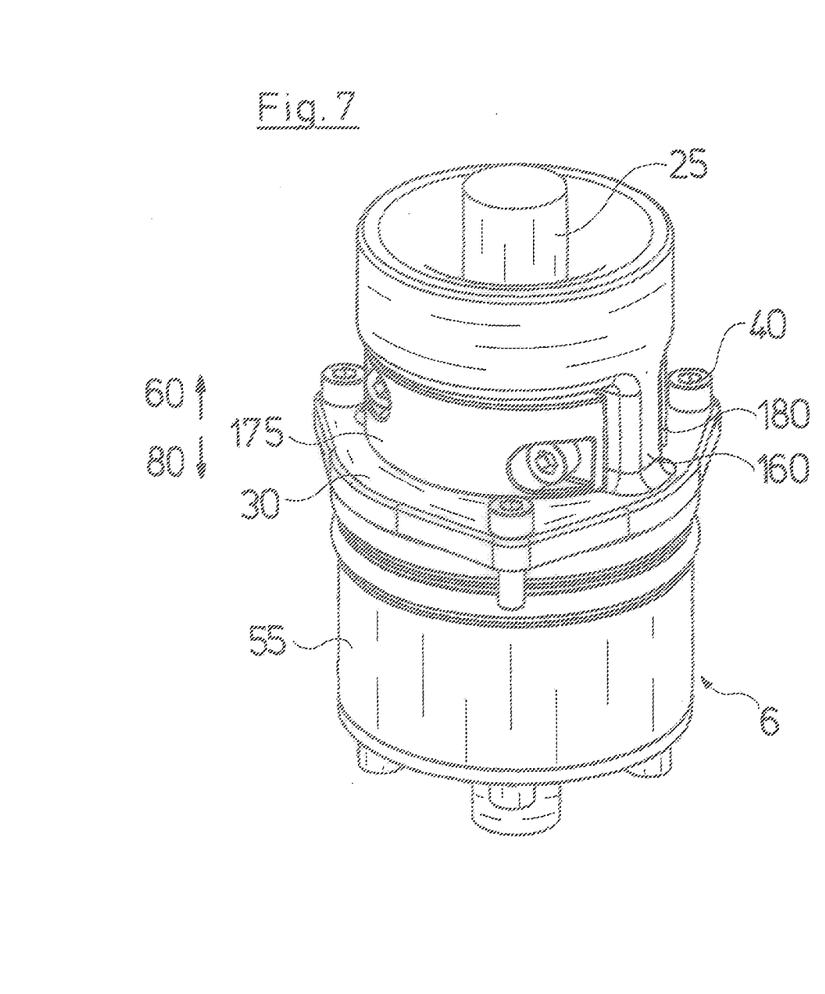
FIG. 7 is a perspective view of the sealing collar according to FIG. 3.
Figure 8:
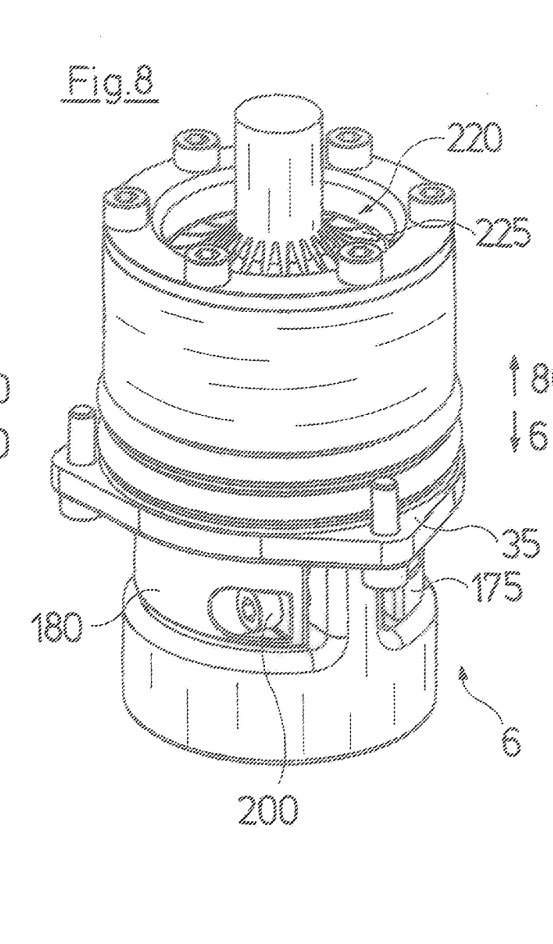
FIG. 8 is a perspective view of the sealing collar according to FIG. 3.

In order to secure the sealing collar 6 to the wall 4, the sealing collar 6 preferably includes a complete projection 30 along the outer periphery of the sealing collar housing 10, which extends radially outwardly, away from the sealing collar housing 10. The projection 30 of the sealing collar housing 10 includes an abutment surface 35, which comes to abut the wall 4 as the sealing collar 10 is being mounted thereto. Screws 40 are used to detachably screw the projection 30 with the wall 4 of the housing 3. The projection 30 thereby divides the sealing collar housing 10 into two axial sections: an axial section provided for accommodation outside the housing 3 of the submersible pump 1, as well as a second axial section of the sealing collar 6, which lies inside the inlet 5 in the wall 4 of the pump housing 3 or inside the pump housing 3.

To ensure that the cable 25 comes to tightly abut in the feed-through 20, the sealing collar 6 preferably includes a first seal in the form of a sealing ring 45, which completely surrounds the axis 15 of the feed-through 20. The inner peripheral surface 50 of the sealing ring 45 here abuts the outer peripheral surface of the cable 25. The outer periphery of the seal 45 is surrounded by a sleeve 55, which forms part of the sealing collar housing 10. The sleeve 55 ends in a direction 60 outside the housing as viewed from the sealing ring 45 in a front wall 65, which continues the projection 30 radially inwardly toward the longitudinal axis 15.

In an axial direction 60 outside the housing, the sealing ring 45 abuts a thin and flat plate 75. The plate 75 here lies on the inside 70 of the front wall 65 of the sleeve 55, and preferably includes a first of two clamping surfaces for the first seal. The plate 75 essentially extends radially to the longitudinal axis 15 of the sealing collar 6, and completely surrounds the latter. To this end, it comprises a central opening oriented coaxially with the feed-through 20. In the direction 80 into the housing, the sealing ring 45 abuts a second plate 85, which preferably includes the second of the two clamping surfaces. The second plate 85 is thin and flat in design like the first plate 75, and essentially extends radially and circumferentially around the longitudinal axis 15 of the sealing collar 6. The plate 85 here also comprises a central opening oriented coaxially with the feed-through 20, through which the cable 25 can be passed.

The two plates 75, 85 are used to apply force to the sealing ring 45 in the assembled state of the sealing collar 6 shown on the figures, pushing it radially into the feed-through 20, i.e., against the outer periphery of an inserted cable. To this end, the plate 85 is exposed to a force in the axial direction along the longitudinal axis 15 toward the plate 75, so that the elastic sealing ring 45 is clinched in an axial direction. The sleeve 55 prevents the material of the sealing ring 45 from expanding outwardly in a radial direction. Therefore, axially clinching the sealing ring 45 causes it to inwardly expand in a radial direction into the feed-through 15. As a consequence, the axial clinching results in an application of force on the cable 25 by the first seal directed toward the longitudinal axis 15 of the sealing collar 6.

The axial force on the plate 85 toward the plate 75 is applied by a compression spring designed as a disk spring packet 90, which consists of several disk springs 95. The disk spring packet 90 is here oriented in such a way that the compressive force it exerts acts in the direction of the longitudinal axis 15 of the sealing collar 6. The disk spring packet 90 is essentially designed with the same outer periphery as the elastic sealing ring 45 of the first seal, and like the latter abuts the inner periphery of the sleeve 55. The disk spring packet 90 comprises a central recess 100 oriented coaxially to the longitudinal axis 15 of the feed-through 20, through which the cable 25 can be guided. The disk spring packet 90 in conjunction with the plates 75 and 85 as well as the sleeve 55 is here a constituent part of the means for applying a force to the sealing ring 45. The disk spring packet 90 is axially clinched, and hence pre-stressed for exerting a compressive force. As a result, the disk spring packet 90 can compensate an axial change in length of the sealing ring 45, so that the plate 85 always abuts the sealing ring 45 under a pressure. In this embodiment, the sealing ring 45 is hence also exposed to a compressive force when the elastic material of the sealing ring 45 loses elasticity as time passes, undergoing plastic deformation and possibly becoming axially shorter in the process.

The disk spring 90 is supported in the direction 80 into the housing against a projection 105 extending axially along the inner circumferential surface 50 of the sleeve 55. On the radially inner side of the sleeve 55, the projection 105 projects completely out of a cover plate 110, which seals the front side of the sleeve 55 in a direction 80 into the housing. The cover plate 110 is detachably screwed to the sleeve 55 by means of screws 115. When tightening the cover plate 110 to the sleeve 55, the projection 105 shifts axially into the sleeve 55, and axially clinches the disk spring 90. Therefore, the latter exerts a compressive force on the plate 85. By mounting the cover plate 110, the disk spring 90 is suitably pre-stressed to exert the compressive force on the plate 85, and hence on the sealing ring 45.

Figure 2:
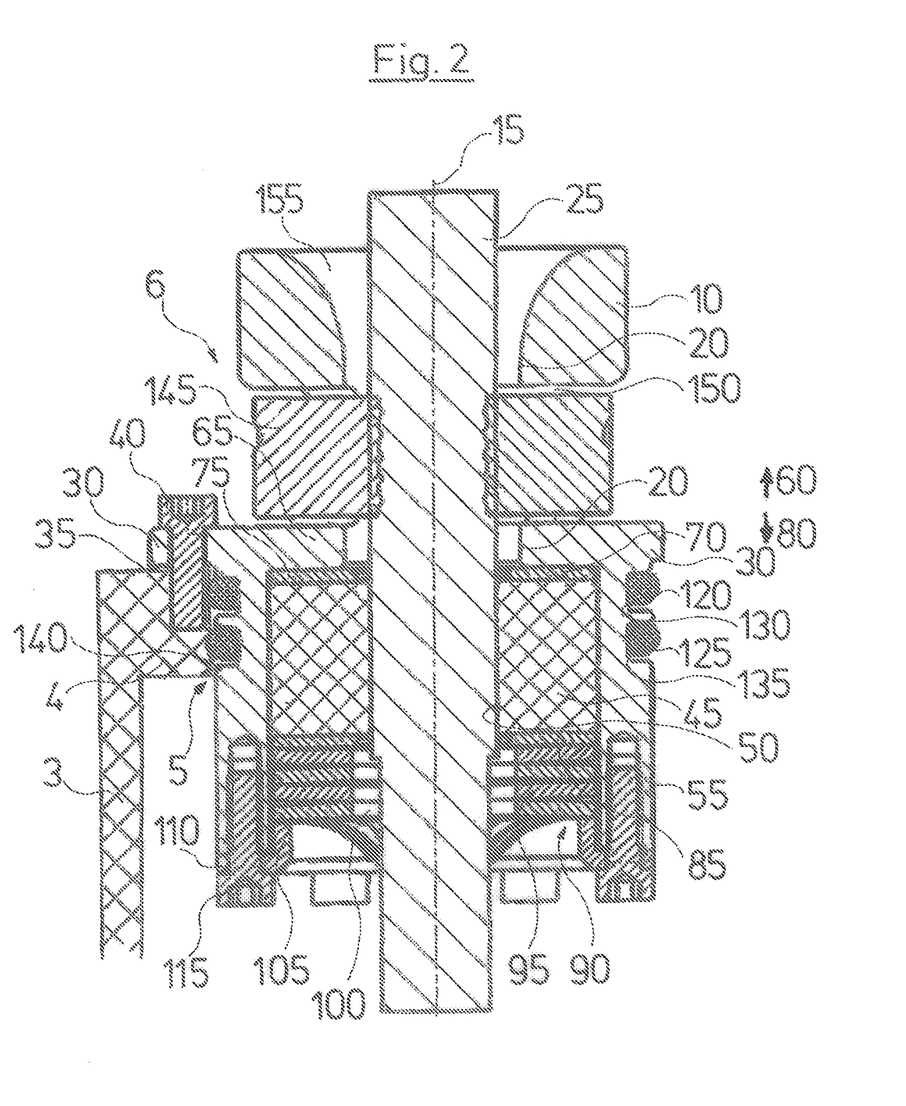

In addition, the sealing collar 6 is detachably and tightly secured to the wall 4 of the housing 3 of the submersible pump 1. To this end, two sealing rings 120, 125 are attached to the sleeve 55 of the sealing collar housing 10 near the projection 30. The two sealing rings 120, 125 are slightly axially offset relative to each other, and circle around the respective outer periphery of the sleeve 55 of the sealing collar housing 10. In order to axially lock in place the sealing rings 120, 125, the latter are clamped in circumferentially running grooves 130, 135 around the sleeve 55. If the sealing collar 6 is attached to the wall 4 of the housing 3 of the submersible pump 1 as shown in FIG. 2, the two sealing rings 120, 125 come to abut the inside 140 of the inlet 5 in an axially tight manner.

In the direction 60 out of the housing, a clamping element in the form of a clamping ring 145 adjoins the projection 30. To this end, the this axial section of the sealing collar housing 10 has two recesses 150 resembling circular segments, which lie on radially opposing sides of the feed-through 20. The two-part clamping ring 145 is incorporated into these recesses 150. The projection 30 or front wall 65 of the sleeve 55 is connected with the part of the sealing collar housing 10 lying on the opening 155 facing outwardly out of the housing via two narrow webs 160, which are situated diametrically opposite each other on the feed-through 20 and separate the two recesses 150 from each other.

The clamping ring 145 surrounds two semi-complete rings 175, 180, which are connected with the webs 160 to clamp the cable 25. To this end, the webs 160 comprise threads, onto which the rings 175, 180 are bolted down by means of screws 195, 200. In the bolted state, the inner diameter of the resultant clamping ring 145 has a smaller diameter than the cable 25 not exposed to a force. For this reason, the cable 25 is axially rigidly locked in place in the feed-through 20 by the clamping ring 145 screwed to the webs 160. In addition, the inner periphery of the clamping ring 145 comprises a profiled clamping surface 205. The profile of the clamping surfaces 205 is formed by clamping ribs 210, which extend in the circumferential direction, and prevent the cable 25 from shifting axially.

The clamping ring 145 establishes a strain relief for the end of the cable 25 lying in the housing 3 of the submersible pump 1. In this way, tensile forces, meaning forces acting in a direction 60 out of the housing and applied to the cable 25 outside the housing 3, do not place a load on the end of the cable 25 inside the housing. Therefore, the electrical terminal contacts lying at the end of the cable 25 inside the housing are protected against tensile forces applied to the cable 25. These tensile forces instead act on the sealing collar housing 10 via the clamping ring 145. In addition, the clamping ring 145 also lies outside the housing of the sealing ring 45 of the first seal. As a result, in particular no tensile forces, especially no asymmetrical forces oriented at an angle to the longitudinal axis 15 of the feed-through 20, act on the sealing ring 45 of the first seal. Therefore, the clamping ring 145 simultaneously also ensures a permanently high sealing action of the sealing ring 45.

In addition, the opening 215 of the sealing collar 5 facing into the housing comprises an electromagnetic shield 220, which comprises a rim of metal tongues 225. The tongues 225 are distributed circumferentially around the longitudinal axis 15 of the sealing collar 5. The tongues extend radially into the feed-through 20, provided no cable 25 is situated therein. However, routing a cable 25 through bends the tongues 225 from the radial direction to an axial direction into the housing, so that the tongues 225 grindingly abut the outer circumferential surface of the cable 25 at an acute angle.

Figure 9:
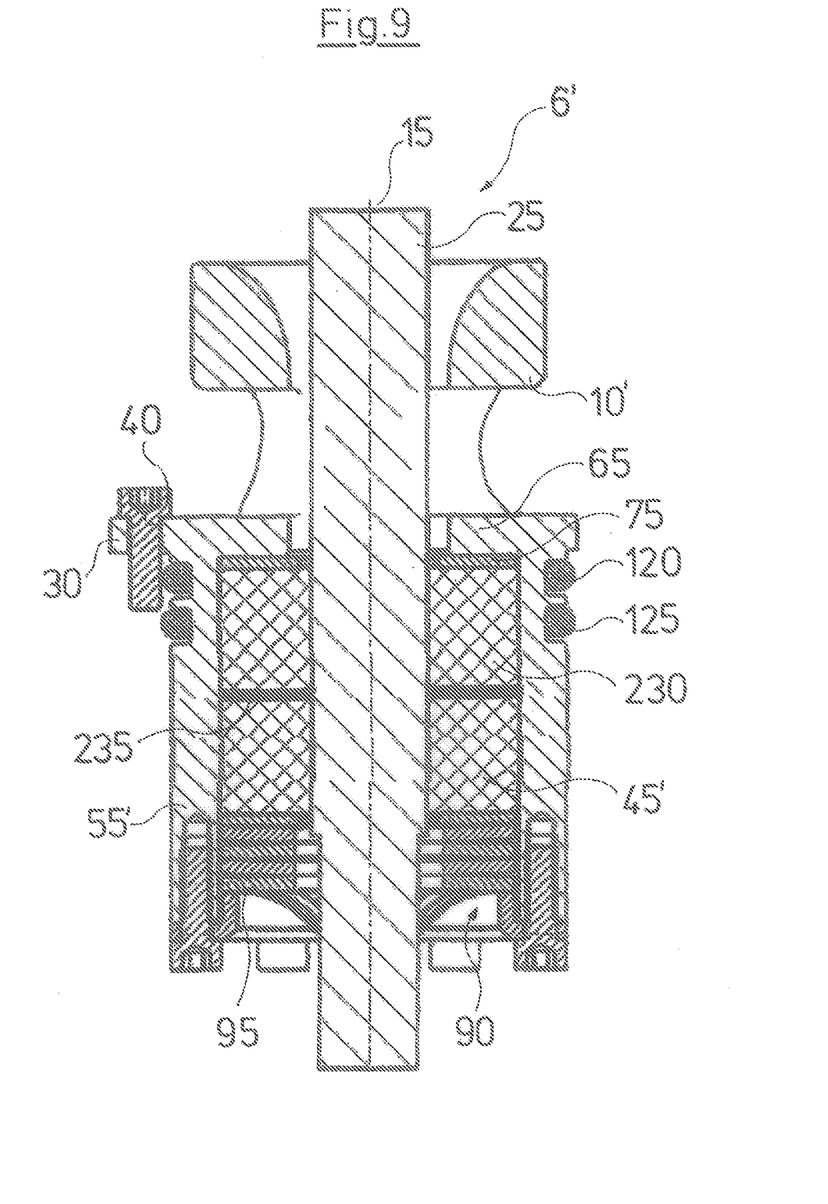
FIG. 9 is a cross-sectional view of sealing collar of a watertight cable feed-through of a submersible pump according to a second preferred embodiment of the present invention.

FIG. 9 shows another preferred embodiment of a sealing collar 6' of a submersible pump according to the present invention. This sealing collar 6' is designed similarly to the sealing collar 6 of the first preferred embodiment described above, but differs from the latter in that the sealing collar 6' preferably includes a two-part seal within the sleeve 55' instead of a clamping ring 145. Provided there in place of the sealing ring 45 of the first seal is a sealing ring 45' abutting the disk spring 90 as the first seal, and another sealing ring 230 away from the latter outside the housing as the third seal. The latter abuts between the sealing ring 45 and the plate 75 frontally lying on the front side 65 of the sleeve 55'. The two sealing rings 45', 230 are separated from each other by another flat, circular plate 235, which is designed and oriented identically to the plates 75 and 85.

This preferred embodiment establishes a frictionally tight connection between the cable 25 and sealing collar housing 10' outside the housing relative to the first seal. In this way, tensile forces acting on the cable 25 can be completely transferred to the sealing collar housing 10' via the third seal. This makes it possible to forego additional clamping elements, such as the clamping ring 145 described above. As a consequence, the sealing ring 230 of the third seal represents an alternative embodiment for a strain relief lying together with the sealing ring 45' of the first seal inside the sleeve 55'.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A submersible motor (2) comprising a housing (3) having a wall (4) with a watertight cable feed-through (5, 6; 5, 6'), the cable feed-through including an inlet (5) in the wall (4) for a cable (25) and a scaling collar (6; 6') having a feed-through (20) for the cable, the sealing collar (6, 6') being detachable from the inlet (5), the sealing collar (6; 6') including a first seal (45; 45') arranged on the feed-through and means for the application of force (75, 85, 90) to the first seal (45; 45') for permanently applying force to the first seal (45; 45') radially into the feed-through (20), the cable feed-through (5, 6; 5, 6') comprising means for detachably attaching (35, 40) the sealing collar (6; 6') to the inlet, wherein the first seal (45; 45') is circumferentially surrounded by a sealing collar housing (10; 10'), a front end of the sealing collar housing being disposed within the motor housing (3) when the sealing collar (6; 6') is attached to the inlet (5), wherein at least a second seal (120, 125) is provided between the sealing collar (6; 6') and inlet (5), and wherein the means for the application of force (75, 85, 90) to the first seal (45; 45') comprises two clamping surfaces (75, 85), between which the first seal (45; 45') is arranged, and with which the first seal (45; 45') is exposed to an axial force, and at least a compression spring element (90) that applies a force to at least one (85) of the clamping surfaces (75, 85), the compression spring element (90) being arranged within the motor housing (3) and supported by a front wall (110) detachably arranged on the front end of the sealing collar housing (10; 10').

2. The submersible motor according to claim 1, wherein the first seal (45, 45') is provided for permanent, axially sealing abutment to the cable (25) and to an inner periphery of the feed-through (20) independently of an attachment of the sealing collar (6; 6') to the housing (3).

3. The submersible motor according to claim 1, wherein the first seal (45; 45') consists of a soft and elastic material.

4. The submersible motor according to claim 1, wherein the first seal (45; 45') is a sealing ring (45; 45') that circumferentially surrounds a longitudinal axis (15) of the feed-through (20) for the cable (25).

5. The submersible motor according to claim 1, wherein the compression spring element (90) is a disk spring (90).

6. The submersible motor according to claim 1, wherein the means for detachably attaching the sealing collar (35, 40) to the wall (4) of an abutment surface (35) is angled relative to a longitudinal axis (15) of the feed-through (20) of the sealing collar (6; 6') and is situated on the sealing collar (6; 6').

7. The submersible motor according to claim 1, wherein a third seal (230) is provided for establishing a tight abutment on the cable (25) and on an inner periphery of the sealing collar housing (10; 10').

8. The submersible motor according to claim 1, wherein the sealing collar (6; 6') comprises a clamping element (145) for clamping the cable (25).

9. The submersible motor according to claim 8, wherein the clamping element (145) comprises a surface (205) that circumferentially surrounds the feed-through (20) for the cable (25) and has circumferentially oriented ribs (210).

10. The submersible motor according to claim 8, wherein the clamping element (145) is situated on an axial section of the feed-through (20) leading out of the housing (3) viewed from the first seal (45; 45').

11. The submersible motor according to claim 1, wherein the second seal (120, 125) comprises at least one sealing ring (120, 125), which is arranged on an outer periphery of the sealing collar (6, 6') and abuts on an inner periphery (140) of the inlet (5).

12. A submersible pump with the submersible motor (2) according to claim 1.

* * * * *